United States Patent Office 2,817,056
Patented Dec. 17, 1957

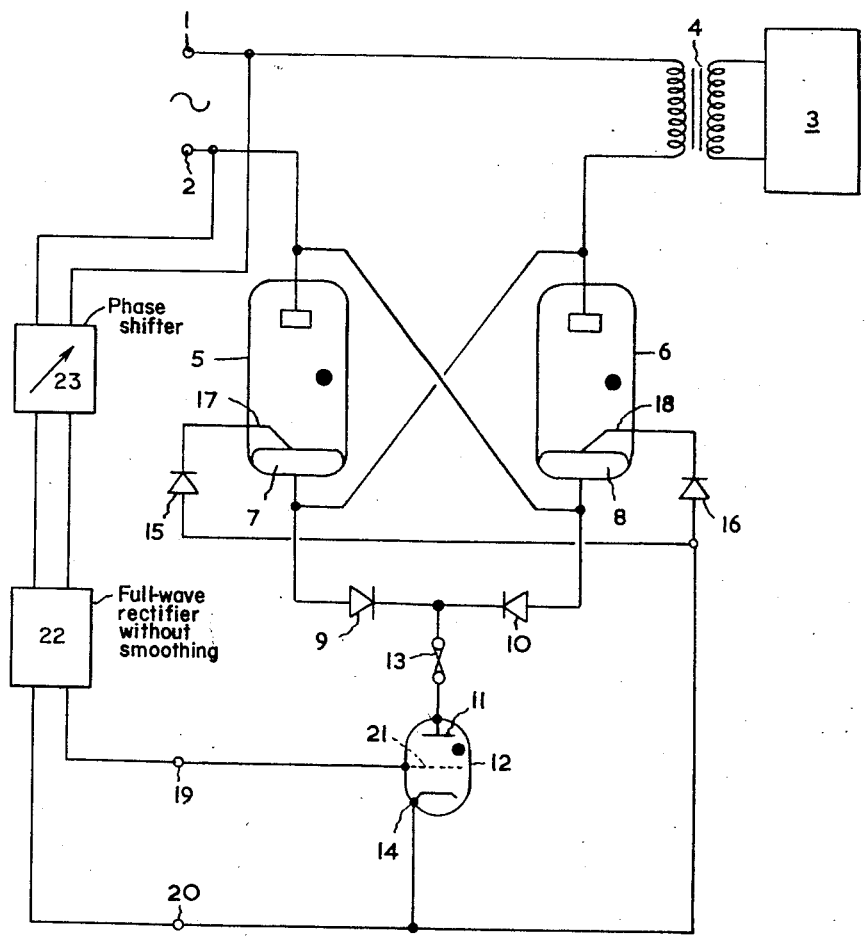

2,817,056

MEANS FOR CONTROLLING THE AVERAGE VALUE OF ELECTRIC CURRENT THROUGH A LOAD

Conrad Roy Bates and Madeline Ethel Bates, Castle Bromwich, England

Application September 12, 1955, Serial No. 533,582

7 Claims. (Cl. 323—4)

This invention relates to means for controlling the average value of an alternating electric current through a load, such as, for example, a welding transformer, or a lighting system, in which dimming is required. It is applicable, however, to any other load through which the average value of the current is to be controlled.

A commonly used method of achieving this control is that of connecting two valves of the ignitron type in reverse parallel relation and putting the pair in series with the load. When a supply of alternating electrical power is connected to the circuit, current will flow through each of the ignitrons in turn, in alternate half-cycles, but only when pulses of electrical energy have been applied to their respective control electrodes. By varying the moment in each half-cycle at which these pulses are applied to the control electrodes, the fraction of each alternate half-cycle for which each ignitron passes current can be regulated, and thus the average value of the current may be determined.

In order to control the point in each half-cycle at which the pulses are applied, it has been hitherto necessary to use two control devices, usually thyratrons, one for each ignitron. By means of the present invention, a single control device can be used to control the pulses to both ignitrons.

According to the present invention, in an electric circuit for controlling the average value of an alternating electric current, including two ignitrons connected in reverse parallel relation, the cathodes of both ignitrons are connected through respective forwardly-directed rectifiers to one terminal of a current-controlling device, of which the other terminal is connected through respective forwardly-directed rectifiers to the two control electrodes of the ignitrons.

By the phrase "forwardly-directed" is meant, allowing conventional current flow from the first-mentioned to the second-mentioned electrode, i. e. from the cathodes of the ignitrons to the current-controlling device, and from the current-controlling device to the control electrodes of the ignitrons. Electron flow will, of course, be in the opposite direction.

The term "ignitron" used above and throughout the specification and claims is intended to include all mercury pool half-wave rectifiers, whether fired by an igniter in the form of a mercury contact striker or electrostatically or by any other means. Whatever form it takes, the means initiating the firing is defined as the control electrode.

The term "current-controlling device" is intended to cover any suitable switching means which can be used to switch on or to increase a flow of current once in each half-cycle. The most convenient form of the device is simply a single thyratron, to the control grid of which pulses are applied at a frequency equal to double that of the alternating current supply.

An example of a circuit according to the invention will now be described with reference to the accompanying drawing.

A source of alternating electric current is connected between terminals 1, 2 to feed a load which may be a transformer 4 supplying a load 3, in series with a pair of ignitrons 5 and 6 connected in reverse parallel relation. The load, may for example, be an electric welding machine, or theatre lighting, or in fact anything to which an alternating current of variable mean value is to be fed.

The cathodes 7 and 8 of the two ignitrons are connected through forwardly-directed rectifiers 9 and 10 respectively to the anode 11 of a thyratron 12, preferably through a fuse 13. The cathode 14 of the thyratron 12 is connected through two respective forwardly-directed rectifiers 15 and 16 to the igniters 17 and 18 forming the control electrodes of the two ignitrons 5 and 6 respectively.

Terminals 19 and 20 are provided for the connection of a source of pulses of controllable phase between the control grid 21 of the thyratron 12 and its cathode 14. These pulses will be at twice the frequency of the mains alternating current applied between terminals 1 and 2, and may be produced by any convenient means. For example, a sine wave of mains frequency may be full-wave rectified, without smoothing, by rectifier 22 and applied to the terminals 19 and 20 in such a sense as to provide sharp positive peaks on the grid 21. A phase-shifting device 23 is included to control the point in each half-cycle at which the thyratron fires, and hence the point at which one or other of the ignitrons fires. For example, in the half-cycle in which the terminal 2 is positive with respect to terminal 1, current flows through rectifier 10 and thyratron 12 as soon as a pulse is received on the grid 21 to fire the thyratron; the current flows also through rectifier 15 to exciter 17, and fires the ignitron 5, which then passes current for the remainder of the half-cycle. The same action occurs through rectifier 9, thyratron 12, rectifier 16 and igniter 18 to fire the ignitron 6 during the succeeding half-cycle.

It will be understood that the method of firing the thyratron 12 may be any that is used in the known arrangements employing two thyratrons, except that the single valve according to the invention must be fired in at a frequency double that of the alternating voltages at terminals 1 and 2 instead of equal to it. Alteration of the phase relationship of the firing with respect to the alternating supply voltage at terminals 1 and 2 alters the fraction of each half-cycle for which the ignitrons conduct, and hence alters the mean overall current through the load.

Whilst the current-controlling device in the example just described is a thyratron, it could, as indicated earlier, take any one of a number of other forms. Its only requirement is that it should be able to produce, at an appropriate point in each half-cycle of the alternating supply, a rise in current or voltage at the control electrode of the corresponding ignitron sufficient to fire it. Thus, other forms of controlled rectifier could be used in place of the thyratron, for example a hard valve or a transistor device, if these can be arranged to conduct the necessary current. Again, a mechanical switch could be employed in place of the thyratron. A suitable switch might be a synchronously driven rotary one, the contacts of which close once during each half-cycle, and by making the angular position of the fixed contact adjustable, or by using helical rotating contacts and moving the fixed contact axially, it would be possible to adjust the phase relationship between the closing of the switch and the alternating supply at terminals 1 and 2, so as to adjust the average value of the current. Another possible form of the device might be a saturable core reactor, known as a magnetic amplifier, or a variably inductive reactor having a moving core.

We claim:

1. An electric circuit for controlling the average value of an alternating electric current comprising two ignitrons electrically connected in reverse parallel relation, each of said ignitrons having an anode, a cathode and a control electrode, a current-controlling device, said device having first and second terminals, a first connection including a first rectifier electrically connected in a forward direction from the cathode of one of said ignitrons to said first terminal, a second connection including a second rectifier electrically connected in a forward direction from the cathode of the other ignitron to said first terminal, a third connection independent of said first and second connections and including a third rectifier electrically connected in a forward direction from said second terminal to one of said control electrodes, and a fourth connection independent of said first and second connections and including a fourth rectifier connected in a forward direction from said second terminal to the other control electrode.

2. An electric circuit as claimed in claim 1, wherein said current-controlling device is a thyratron, having an anode, a cathode and a grid, the anode being connected to said first terminal and the cathode to said second terminal.

3. An electric circuit as claimed in claim 2, including a source of electrical pulses, said source being connected between said grid and cathode of said thyratron.

4. An electric circuit as claimed in claim 3, wherein said source of pulses is a full-wave rectified sine wave electric potential.

5. An electric circuit for supplying a controlled current to a load, comprising a source of an alternating electric current, a pair of ignitrons electrically connected in reverse parallel relation and in series with said source, each of said ignitrons having an anode, a cathode and a control electrode, a current-controlling device, said device having first and second terminals, a first rectifier electrically connected in a forward direction from the cathode of one of said ignitrons to said first terminal, a second rectifier electrically connected in a forward direction from the cathode of the other ignitron to said first terminal, a third rectifier electrically connected in a forward direction from said second terminal to one of said control electrodes, and a fourth rectifier connected in a forward direction from said second terminal to the other control electrode, and means for switching on said current-controlling device at a frequency equal to double that of said source of alternating current.

6. An electric circuit as claimed in claim 5, and including means for adjusting the phase relationship between said switching means and said source of alternating current.

7. An electric circuit as claimed in claim 5, wherein said current-controlling device is a grid-controlled rectifier, and said switching means comprise a source of electrical pulses connected to said grid.

References Cited in the file of this patent

UNITED STATES PATENTS 2,471,817   Herz _____ May 31, 1949